US007962619B2

(12) United States Patent
Gazier et al.

(10) Patent No.: US 7,962,619 B2
(45) Date of Patent: Jun. 14, 2011

(54) METHODS AND SYSTEMS FOR EXTENSIBLE MARKUP LANGUAGE CONTROL OF NETWORK EQUIPMENT

(75) Inventors: Michael A. Gazier, Ottawa (CA);
Lyndon Y. Ong, Sunnyvale, CA (US);
Ian H. Duncan, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 716 days.

(21) Appl. No.: 11/540,786

(22) Filed: Sep. 29, 2006

(65) Prior Publication Data
US 2008/0082649 A1 Apr. 3, 2008

(51) Int. Cl.
*G06F 15/173* (2006.01)
(52) U.S. Cl. .......... 709/226; 709/220; 709/227; 398/48
(58) Field of Classification Search .................. 709/220, 709/223, 227, 226; 398/48
See application file for complete search history.

(56) References Cited

U.S. PATENT DOCUMENTS

| 7,489,867 B1* | 2/2009 | Viscardi et al. ............... 398/58 |
| 7,584,262 B1* | 9/2009 | Wang et al. ................... 709/217 |
| 2002/0081971 A1 | 6/2002 | Travostino |
| 2002/0156914 A1 | 10/2002 | Lo et al. |
| 2003/0140132 A1 | 7/2003 | Champagne et al. |
| 2003/0145054 A1* | 7/2003 | Dyke .............................. 709/205 |
| 2005/0228850 A1 | 10/2005 | Zhu et al. |
| 2006/0045117 A1* | 3/2006 | Qi et al. ........................ 370/445 |
| 2006/0075042 A1* | 4/2006 | Wang et al. ................... 709/206 |
| 2006/0288092 A1* | 12/2006 | Subramaniam ............... 709/220 |

OTHER PUBLICATIONS

"This is the Way—This is Nortel—Application Brief Dynamic Resource Allocation Controller (DRAC)", Nortel Networks; www.nortel.com; 2004.
Travostino, Franco, This is the Way—Project DRAC—Building the Hi-Touch Plane, Advanced Technology, Nortel Networks.

* cited by examiner

*Primary Examiner* — Ario Etienne
*Assistant Examiner* — El Hadji Sall
(74) *Attorney, Agent, or Firm* — Clements Bernard PLLC; Christopher L. Bernard; Jeffrey M. Measures

(57) ABSTRACT

The present invention utilizes an XML-based protocol for controlling a plurality of settings to tie network equipment together, such as telecommunications, cable, enterprise, wireless, etc., across different transport network technologies, including optical, wireless, TDM, and packet. Network requests are carried in self-describing XML messages that are parsed by a general XML language parser. This changes the paradigm of XML used to control data records to XML controlling network equipment. This has many benefits including the ability to better function in the new IMS infrastructures being assembled.

20 Claims, 9 Drawing Sheets

US 7,962,619 B2

METHODS AND SYSTEMS FOR EXTENSIBLE MARKUP LANGUAGE CONTROL OF NETWORK EQUIPMENT

FIELD OF THE INVENTION

The present invention relates generally to methods and systems for controlling a network, including, but not limited to, an optical network. More specifically, the present invention relates to Extensible Markup Language (XML)-based methods and systems for controlling the network, including, but not limited to, the optical network. In particular, an XML-based protocol is used between network elements to set up resources and/or services across the network.

BACKGROUND OF THE INVENTION

Traditionally, a network is controlled at each of the Open Systems Interconnection (OSI) layers. The OSI model is a logical structure for network operations standardized by the International Standards Organization (ISO). The OSI model organizes the communications process into seven different categories and places these categories into a layered sequence based upon their relationships to other processes. Layers seven through four deal with end-to-end communications between a message source and a message destination, while layers three through one deal with network access. The layers communicate with their peers in the network. For example, at layer 0, optics can be populated with specific wavelengths. In some automated systems, optics can be programmed with certain characteristics, such as wavelengths, filters, and optical switching capabilities at the optical layer. Typically, these are all controlled by an Element Management System (EMS), Network Management System (NMS), or Operations Support System (OSS). For example, at layer 1, the network is typically based on a Synchronous Optical Network/Synchronous Digital Hierarchy (SONET/SDH) standard, offering virtual Time Division Multiplexing (TDM) and data channels within the bit streams. The channels are built, switched, or dismantled at nodes. Again, this is typically controlled by the EMS. More recently, layer-specific resource control protocols, such as Resource Reservation Protocol (RSVP), have been defined to control the network (reference Generalized Multi-Protocol Label Switching (GMPLS)). For example, at layer 2, a common protocol is Ethernet. Ethernet networks can be provisioned as in Provider Backbone Transport (PBT) networks (http://www.ieee802.org/1/files/public/docs2005/ah-bottorff-pbt-for-iee-v41-0905.pdf or http://www.ietf.org/internet-drafts/draft-allan-pw-o-pbt-00.txt). However, Ethernet networks typically provision simply by using the broadcast mechanism that is inherent in Ethernet. Optimizations have been added to extend reach and efficiency, such as bridges and multi-link bonding, which has added to the complexity of the protocols used, without changing the basic principles. For example, at layer 3, the Internet Protocol (IP) layer, IP routing is used to interconnect nodes in a network. Typically, these nodes all run routing protocols, such as Routing Information Protocol (RIP), Open Shortest Path First (OSPF) protocol, etc. Modern networks often apply key mechanisms, such as Multi-Protocol Label Switching (MPLS), at this layer in order to enhance the scalability of, add features to, or increase the stability of the networks. For example, at layer 4, data transport reliability, service ports, and the like are addressed. For example, at layer 5, the session layer, SIP can be used to initiate sessions. A session is a communication of some form between two peer entities. A relevant example is the initiation of a voice call from a wireless (WiFi)-enabled Personal Digital Assistant (PDA). The WiFi-enabled PDA generates the voice call to another user in a form such as "INVITE name@yourisp.com" using SIP. The SIP agents track "name" and are aware of many items, such as, but not limited to, the location of "name" (e.g. "name" is now in "city"), the presence/availability of "name" (e.g. "name" can only be contacted by "family" at this time), and the media of "name" (e.g. "name" has set up the network to forward voice calls to a home voicemail at this time).

Current efforts to define protocols for optical networking have focused on layer-specific controls. Disadvantageously, layer-specific controls require accessing each layer to set up resources and/or services across the network. For example, for layer 0, protocol definition has focused on the specification of the wavelength to be used for a connection, the level of optical impairments that are allowed in the connection, and the source and destination within an optical network. Additionally, for layer 1, protocol definition has focused on the specification of the timeslot to be used for a connection within a TDM signal, the type of links to be used in the sense of any automated protection functionality associated with the links, etc. This work has been defined in the Internet Engineering Task Force (IETF) standards, such as Request for Comments (RFC) 3471, the GMPLS signaling functional description; RFC 3473, the GMPLS signaling extensions to RSVP; and RFC 3946, the GMPLS extensions for SONET/SDH control.

What has not been fully explored, however, is the area of technology-independent control that is required to offer services over a particular layer network. This is termed "call control" in the related standards (especially Automatically Switched Optical Network (ASON) or International Telecommunications Union (ITU-T) Recommendation G.8080) and is currently embodied in protocols only as a common identifier that links together signaling for multiple connections, or as a connection-independent control plane flow for purposes such as pre-connection compatibility verification. The former is described in ITU-T Recommendation G.7713.2, the specification for Distributed Call/Connection Management Using GMPLS RSVP-TE, while the latter is described in IETF draft "draft-ietf-ccamp-gmpls-rsvp-te-call-00.txt," a work in progress.

BRIEF SUMMARY OF THE INVENTION

Typically, services in a network are set up via direct provisioning performed by an EMS/NMS/OSS, i.e. a platform supporting multiple Wavelength Division Multiplexed (WDM) spans in order to provide Network Management (NM) services or a system responsible for managing at least part of the network, and communicating with agents in order to help keep track of network resources, statistics, and performance. Alternatively, services in the network are set up via automated nodal software that is capable of performing routing under EMS/NMS/OSS command. The present invention utilizes an XML-based protocol between network elements for controlling a plurality of settings to tie network equipment together, such as telecommunications, cable, enterprise, wireless, etc., across different transport network technologies, including optical, wireless, TDM, and packet. Network requests are carried in self-describing XML messages that are parsed by a general XML language parser. This changes the paradigm of XML used to control data records to XML controlling network equipment. This has many benefits, including the ability to better function in the new IMS infrastructures being assembled.

The XML-based protocol, although used between network elements supporting a specific technology or technologies, such as optical, TDM, Ethernet, IP, etc., is used to carry information that is technology-independent and reflects the end-to-end service required from the network, i.e., the type of data flow being carried end-to-end, as well as the call or session state end-to-end. Network elements supporting a specific technology can then determine from this information those requirements that are needed to support the end-to-end service within this technology, e.g., for TDM, the number of time slots of a particular signal type required to support the data flow.

In one exemplary embodiment of the present invention, a network method utilizing Extensible Markup Language to establish a network service between network elements in a network includes generating a request at a network element for a network service in Extensible Markup Language, wherein the request is one of manually and automatically configured, and wherein the request is directed to another network element; obtaining network resources responsive to the request, wherein the network resources comprise network parameters required to obtain and provision the network service; and configuring the network resources responsive to the request. Preferably, the network includes a plurality of network elements operable to receive Extensible Markup Language requests. Optionally, the plurality of network elements includes a plurality of optical network elements, wherein the network route comprises wavelengths between first and second optical network elements in the network. Alternatively, the network comprises one of a telecommunications network, a cable network, an enterprise network, a wireless network, and a combination thereof.

In another exemplary embodiment of the present invention, a network utilizing Extensible Markup Language to establish network services between network elements in the network includes a plurality of network elements operable to receive Extensible Markup Language requests; and an Extensible Markup Language server connected to one or more of the plurality of network elements; wherein the Extensible Markup Language requests comprise requests for network resources to establish a network service between two network elements; and wherein the network is operable to configure network resources responsive to the Extensible Markup Language requests. Optionally, the network includes an optical dense wavelength division multiplexed network. Alternatively, the network includes one or more of a telecommunications network, a cable network, an enterprise network, a wireless network, and a combination thereof.

In a further exemplary embodiment of the present invention, a network utilizing Extensible Markup Language to control network resources includes an Extensible Markup Language application; and one or more nodes, wherein the one or more nodes are connected to the application; wherein the application is operable to generate network requests for network resources in Extensible Markup Language; and wherein the network is operable to control network resources responsive to the network requests. Optionally, the network request is for bandwidth on the network and the network request is directed to the one or more nodes connected to the application. Alternatively, the network request includes a plurality of parameters, wherein the plurality of parameters comprise a plurality of Open Systems Interconnection layer parameters operable to control network resources.

In a still further exemplary embodiment of the present invention, a network utilizing Extensible Markup Language to control a plurality of Open Systems Interconnection layer resources in order to eliminate dependencies on the network being homogeneous includes an Extensible Markup Language application, wherein the application resides on a database; and one or more nodes with multiple Open Systems Interconnection layer resources, wherein the one or more nodes are connected to the database; wherein the application is operable to generate network requests in Extensible Markup Language for network resources across a plurality of Open Systems Interconnection layers, wherein the requests are operable to be received at any one of the plurality of Open Systems Interconnection layers for network resources at any one of the plurality of Open Systems Interconnection layers; and wherein the network is operable to control and switch network resources across the plurality of Open Systems Interconnection layers responsive to the network requests. Optionally, the application separates control and switching.

BRIEF DESCRIPTION OF THE DRAWINGS

The present invention is illustrated and described herein with reference to the various drawings, in which like reference numbers are used to denote like system components and/or method steps, as appropriate, and in which.

DETAILED DESCRIPTION OF THE INVENTION

Figure 1A:
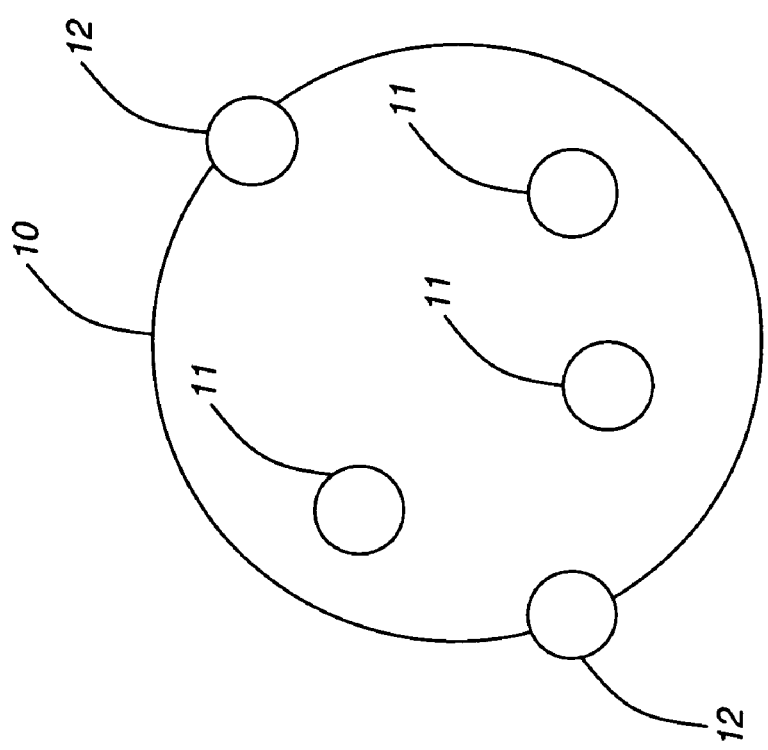
FIGS. 1a-1c are schematic diagrams illustrating a telecommunications network in varying exemplary embodiments of the present invention.

Typically, services in a network are set up via direct provisioning performed by an EMS/NMS/OSS, i.e. a platform supporting multiple WDM spans in order to provide NM services or a system responsible for managing at least part of the network, and communicating with agents in order to help keep track of network resources, statistics, and performance. Alternatively, services in the network are set up via automated nodal software such as RSVP-TE that is capable of performing routing under EMS/NMS/OSS command. The present invention utilizes an XML-based protocol for controlling a plurality of settings to tie network equipment together, such as telecommunications, cable, enterprise, wireless, etc., across different transport network technologies, including optical, wireless, TDM, and packet. Network requests are carried in self-describing XML messages that are parsed by a general XML language parser. This changes the paradigm of XML used to control data records to XML controlling network equipment. This has many benefits, including the ability to better function in the new IMS infrastructures being assembled.

Service-Oriented Architecture (SOA) expresses a perspective of software architecture that defines the use of services to support the requirements of software users. In an SOA environment, resources on a network are made available as independent services that can be accessed without knowledge of their underlying platform implementation. SOA is usually based on Web services standards (e.g., using SOAP or REST) that have gained broad industry acceptance. These standards (also referred to as Web service specifications) also provide greater interoperability and some protection from lock-in to proprietary vendor software. However, one can implement SOA using any service-based technology. The present invention offers the idea that SOA can utilize XML to control network resources in a network. In a SOA world, the architecture is tied directly to the Web (HTTP/SOAP/BEEP/etc) and the form of the services are derived directly from enterprise-distributed computing models of design or similar approaches, such as "grid" computing. It is more likely in SOA that the network being controlled is "owned" within a large enterprise and the SOA provider is either a branch of IT or a more traditional computing services contractor.

User Controlled Light Paths (UCLP) is a distributed network control application developed to support the sharing of network facilities amongst a community of users. This sharing is achieved by providing a software object model of the explicit set of available resources comprising the physical network segments and cross-connect equipment, with supported methods for provisioning and control of these resources. The users of the application interact with these UCLP objects to concatenate segments and cross-connects and assemble path objects that model services in the network. This mode of directly and explicitly manipulating models of the physical equipment and facilities to create service desired topologies has limitations as it necessarily exposes details of the underlying network infrastructure. Understanding and correctly interacting with these details can be a burden to users simply seeking service. Revealing network design and operational state at this level of detail is commercially undesirable for many service providers. UCLP is built on a web services framework provided by the XML-based Simple Object Access Protocol (SOAP). The UCLP application interacts with the various existing configuration control interfaces (typically TL1 or SNMP) of the underlying physical network elements to establish services.

SDP is a format for describing streaming media initialization parameters and has been published by the IETF as RFC 2327. SDP describes multimedia sessions for the purposes of session announcement, session invitation, and other forms of multimedia session initiation. SDP is a container for messages that can describe what is requested. This can be a description of what resources are desired, what capabilities a requestor has, etc. The SDP syntax is intended to support the addition of key:value codes to support extension of a functional application. Further, there are opportunities to augment or replace SDP in XML in order to define preferred or mandatory resource request parameters with XML. With some modification to the coding, UCLP can be directly encapsulated.

SIP is a protocol developed by the IETF MMUSIC Working Group. It is also a proposed standard for initiating, modifying, and terminating an interactive user session. This interactive user session typically involves multimedia elements, such as voice, video, instant messaging (IM), online gaming, virtual reality, etc. SIP has been accepted as a 3GPP signaling protocol, as well as a permanent element of the IP Multimedia Subsystem (IMS) architecture. As described above, it is one of the leading signaling protocols for VoIP, along with H.323. In general, SIP uses a specific message format that is defined in RFC 3261. Equivalently, the semantics of SIP can be embodied in an XML-based protocol that performs the same set of functions for controlling a network, but is carried in self-describing messages that are capable of being parsed by a general XML parser. This changes the paradigm of XML, used to control data records, now controlling network equipment. This provides many benefits, including the ability to better function in the new IMS infrastructures that are being assembled.

XML can be described as a meta-container language used for binding semantics onto data, enabling information portability (reference also "s-expression"). There is equivalence between SIP+SDP, SIP+SDP+XML, and SIP+XML (where "+"is used to indicate that the item to the right is contained in the item to the left). For example, XML can be the base container, as is SIP as described above—resulting in structures such as XML, XML+SDP, and XML+SIP (i.e. SIP being carried in an XML base container). XML can be an alternative to SDP as described below, being carried in a SIP message. It should be noted that XML is used as the base protocol in some networking equipment, as one possible way to provision the networking equipment. The present invention, however, relates to using XML in order to provision services or acquire other network resources across an entire network. The request to provision such services or acquire such other network resources is generated by either the network equipment itself or applications, as described below. Again, SIMPLE or XMPP, as well as other XML-based equivalents, can be used in conjunction with the methods and systems of the present invention.

In general, XML is a W3C-recommended general purpose markup language that is used to create special purpose markup languages, capable of describing a plurality of different kinds of data. XML describes data and contains the data as well, in a database. It is a subset of Standard Generalized Markup Language (SGML), and its primary purpose is to facilitate the sharing of data across different systems, including those connected to the Internet. Languages that are based on XML include Geography Markup Language (GML), Resource Definition Framework (RDF)/XML, Rich Site Summary (RSS), Atom, MathML, Extensible HyperText Markup Language (HTML), Scalable Vector Graphics (SVG), MusicXML, etc. These languages can be modified and validated by programs without prior knowledge of their form.

XML provides a text-based means to describe and apply a tree-based structure to information. All of the information manifests as text, interspersed with markup that separates the information into a hierarchy of character data, container elements, and attributes of those container elements. Data structures are expressed in a formal, relatively simple manner. An XML schema is a description of a type of XML document, expressed in terms of constraints on the structure and content of documents of that type, in addition to the constraints imposed by XML itself. A plurality of standard and proprietary XML schema languages have emerged for the purpose of formally expressing such schemas, and some of these XML schema languages are themselves XML-based.

XML extensions include: XPath—provides random access to XML data for other technologies, including Extensible StyleSheet Language Transformation (XSLT), Extensible StyleSheet Language Format (XSL-FO), XQuery, etc., and refers to all or part of the text, data, and values in XML elements, attributes, processing instructions, comments, etc.; XQuery—analogous to Structured Query Language (SQL) for relational databases; XML Namespaces—enables the same document to contain XML elements and attributes taken from different vocabularies without naming collisions occurring; XML Signature—defines the syntax and processing rules for creating digital signatures on XML content; XML Encryption—defines the syntax and processing rules for encrypting XML content; and XPointer—is a system for addressing components of XML-based Internet media.

In summary, XML is a meta-container language that is used for binding semantics onto data, enabling information portability (reference also "s-expression"). It is used to exchange information in a structured manner, allowing devices or applications to later retrieve or modify the data in an efficient manner. In general, the present invention XML is used to carry SIP-like semantics, i.e., session initiation requests and confirmations.

Figure 1B:
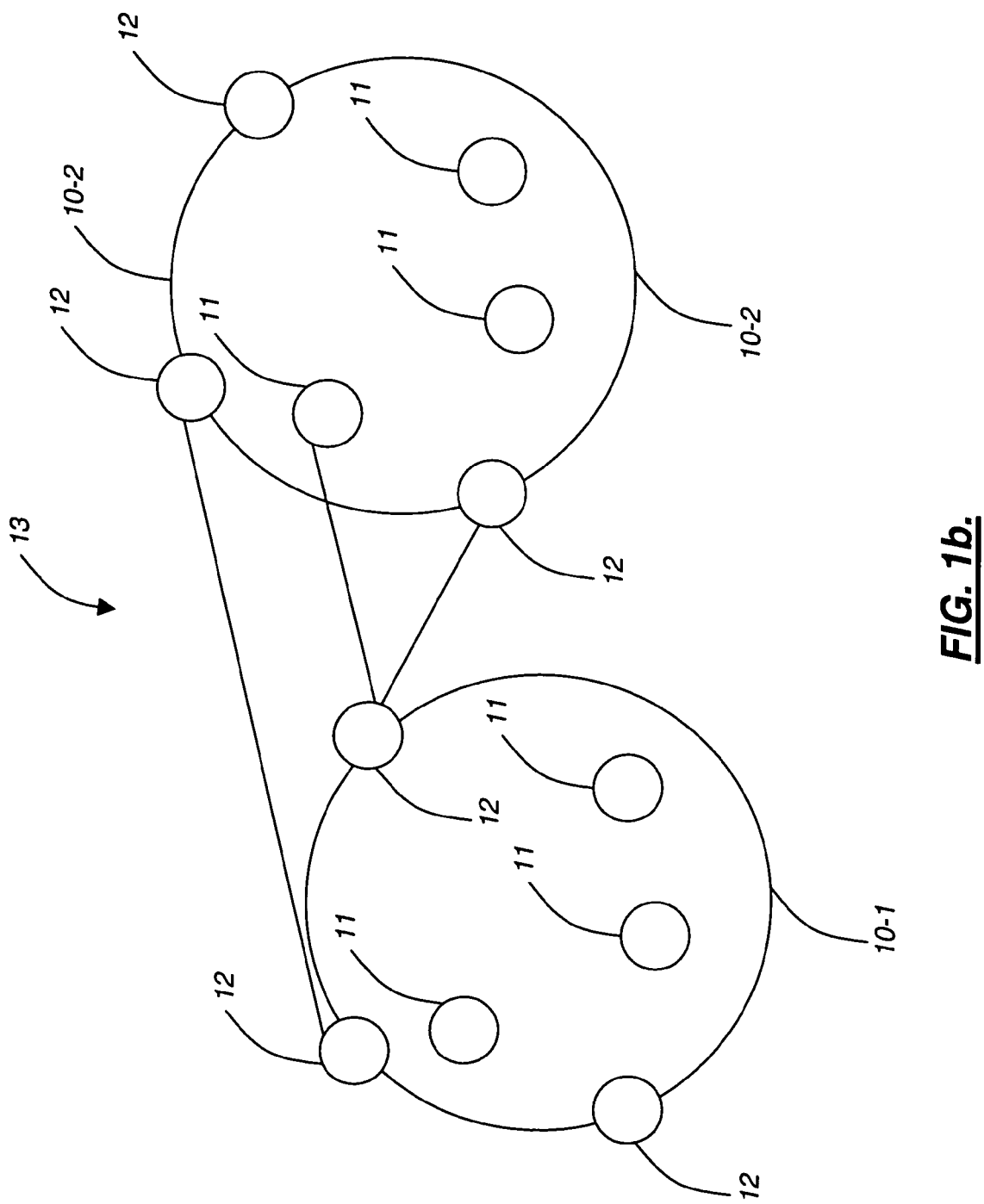
Figure 1C:
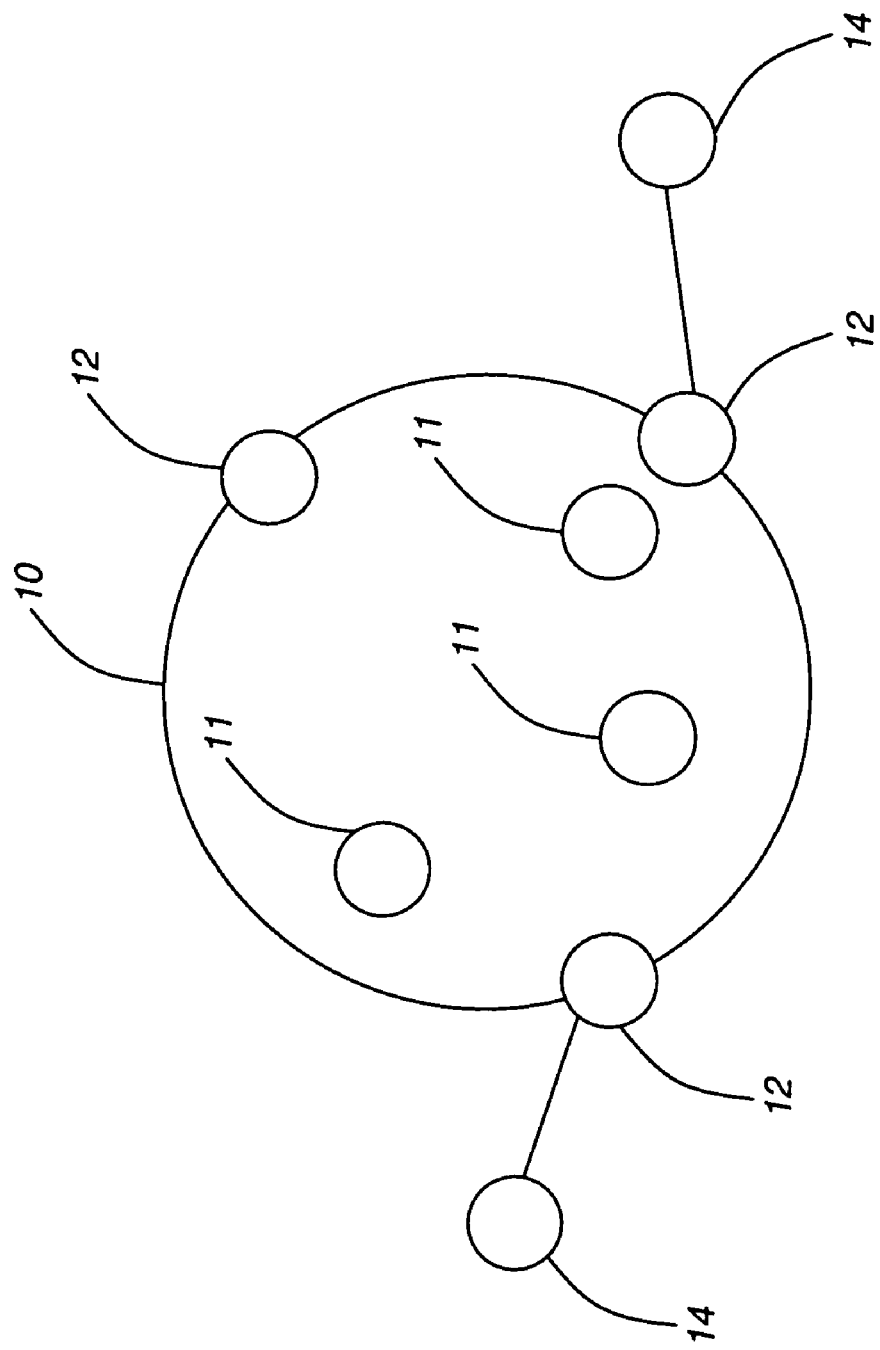

The present invention also provides a new class of device that blends computer applications, hosts, or features with networking equipment to allow XML requests to control network resources across multiple OSI layers. FIGS. 1a-1c illustrate a telecommunications network 10, in varying exemplary embodiments of the present invention. FIG. 1a illustrates a network 10 with core nodes 11 and edge nodes 12. FIG. 1b illustrates that two networks 10-1, 10-2, such as depicted in FIG. 1a, interconnect to form a larger network 13, as is common with separate carriers performing interconnects between their respective networks. FIG. 1c illustrates a network 10 with external nodes running an application 14 connecting to edge nodes 12, which is common when external nodes attach to a network.

Referring to FIG. 1a, the network 10 includes core nodes 11 and edge nodes 12. The network 10 can include any telecommunications devices for nodes, such as optical network elements (e.g. dense wavelength division multiplexing (DWDM) elements), SONET network elements (e.g. OC-48, OC-192 elements), and data network elements (e.g. routers, switches). Traditionally, the nodes 11,12 are provisioned and operated through an EMS that connects to one or more of the nodes 11,12. In accordance with the present invention, the nodes 11,12 are configured to accept XML commands to access network resources.

The nodes 11,12 are equipped with XML Client and/or Proxy entities that can receive and generate XML messages to support session establishment independent of the network technology. The XML Client and/or Proxy can be hosted directly on the central processor units of the nodes 11,12, or may be hosted by an attached processor. In a typical case, node 11 receives a request in XML from an application residing on a network application server, which contains session information such as the session destination and session characteristics (e.g., bandwidth, application, coding format, etc.). It processes this to determine the specific requirements to support this session in the particular network technology (e.g., packet, SONET/SDH, optical) supported by network 10, and arranges for the necessary allocation of resources in its network. It also forwards the XML request to the next XML Proxy as determined by a DNS lookup or other mechanism, which could also be the destination XML Client.

One of the edge nodes 12 receives an XML request from a high-bandwidth network user residing outside its local network domain, again containing session information that it processes to determine specific requirements for the network technology in the network 10, and arranges for allocation of resources in its network, and forwards the XML request to the next XML Proxy. A variety of mechanisms can be used for resource allocation within the network 10, including local technology-specific protocols used between network nodes, and local EMS, if this is used for resource control. For SONET/SDH, for example, an edge node 12 might determine from the XML request where the supporting egress node is for the session, and compute a SONET/SDH path to that egress node based on the bandwidth and class of service requirements associated with the application type, bandwidth requirements, and codec indicated in the XML request. The SONET/SDH path might then be created by using the internal control plane signaling in the network 10, such as sending a PNNI SETUP message if OSRP is used within the network 10.

Referring to FIG. 1b, the network 13 includes two networks 10-1,10-2, such as those depicted in FIG. 1a, to form a larger network. In the network 13, nodes 11,12 from each of the smaller networks 10-1,10-2 are operable to communicate with one another. This illustrates the example where two carriers meet and interconnect their nodes 11,12. In accordance with the present invention, the nodes 11,12 from both networks 10-1,10-2 are configured to accept XML requests to access network resources. This provides an ability to provision and operate the nodes 11,12 on separate platforms.

The nodes 11,12 in the networks 10-1,10-2 communicate session service requirements using XML to establish a session crossing both networks 10-1,10-2. Since the XML request convey the service requirements and is technology independent, an edge node 12 in network 10-1 can derive the requirements for supporting the session in the network's technology, while an edge node 12 in network 10-2 can also derive the requirements for supporting the session in the network's technology. Supporting allocation of resources then can be done independently in each network.

For example, if one network 10-1 is a SONET/SDH network using an internal control plane, such as OSRP, then resources are allocated by sending a PNNI SETUP message requesting SONET/SDH timeslot allocation with an associated class of service in order to set up a SONET/SDH path from the ingress node to the egress node. If another network 10-2 is, on the other hand, a photonic network using an EMS to control the network, then resources are allocated by having an edge node 12 receive the XML request, determine photonic requirements such as wavelengths required, length of path allowed, etc., either using local path computation or using the assistance of an EMS, and then communicate with the EMS in order to create the necessary path across the network. The EMS then communicates with core nodes 11 and an edge node 12 for the network 10-2 in order to create a supporting path across the network for the session. In general, it should be noted that the network 13 may be a heterogeneous network, in that the networks 10-1, 10-2, may be different types of networks. In such a case, XML is used at the "bridge points." In addition, different types of intervening networks are possible. It should also be noted that the concepts of the present invention are not limited to optical, and, specifically, DWDM networks, but contemplate a wide range of applications.

Referring to FIG. 1c, there is an application 14, such as that residing in a database in an enterprise, and a network 10, such as that provided by a carrier, or such as a private network. The application 14 is able to parse XML requests for access network resources. The application 14 generates a request which is in the XML format. The request can be a manually configured request that triggers an event, or it can be it an automated request, such as that provided by a computer program. This request allows the application 14 to obtain network resources. For example, a database needs to perform a backup and requests new and, in this example, temporary bandwidth from the network 10. Advantageously, the request is directed to the network 10, and not to the destination, this being an important distinction from conventional methods and systems and from the way XML was designed to work. The request can contain a plurality of parameters, and can even include capability exchange to a network broker, similar to that contained in an SDP message. The request can involve items such as wavelength, bandwidth, and even higher-layer concepts, such as Ethernet or IP parameters. The request can allow the network 10 to avoid the requirement that all OSI layers are supported in the network, this also being an important and separate distinction.

This capability allows abstraction of subnetworks within the network 10. For example, consider a request from an enterprise database to a network. Consider the first network span to be a layer 0 only capable network. The XML request is routed to the controller that sets up a layer 0 optical path across this span. The next hop is to an Ethernet capable network, which also has layer 0 capability. The XML request is handed off to the controller for that subnetwork that sets up appropriate parameters in that piece of the network (be it done as provisioned or signaled in that network). This XML request is compatible with the first hop, e.g., perhaps the optical wavelength has to be the same, and this is ensured by either the serialization of the XML request process, or by a controller overseeing all hops, or by a combination of both. The abstraction of the capabilities of each subnetwork can result in some pieces being able to route at layer 3, some being able to switch at layer 2 or 1 or 0, but the important fact is that the service appears to be at all required layers from the requestor's point of view. This is applicable to any combination of capabilities and subnetworks in any order as happens to be installed. The XML requests are routed (sent) to appropriate controllers which can themselves be in a hierarchical or serial or single node architecture.

The network 10 can even be multiple carrier networks, where the XML request is used as universal intercarrier resource request. This is illustrated in FIG. 1*b*. This, in fact, fits directly into an IMS network. An IMS or similar network is compatible with this mechanism, and brings certain advantages even though these advantages can be brought to bear without a true IMS solution. For example, some of the main benefits of IMS are to authenticate the source XML request in order to authenticate the requester, to determine what the requestor is allowed to obtain as services, and to bill appropriately, even intercarrier. With respect to IMS, the present invention provides an XML-enabled network resource request that is a new way of using the XML—to the network or within the network to itself (intranodal requests). In general, an XML parser and "call processing" functionality is required to interpret the XML request and obtain specific actions from a given layer of the network 10.

The present invention can be applied to any network 10 which is configured to accept XML requests. This includes, but is not limited to, optical networks (SONET, DWDM), data networks (IP, Ethernet, ATM), wireless networks, storage-area networks, cable networks, enterprise networks, among others. The network 10 can include a combination of different networking technologies, but controlled utilizing the same XML requests. For example, a network 10 can include optical DWDM network elements with SONET OC-192 each carrying Ethernet over SONET and users connected to the routers which in turn connect to through the SONET OC-192 wavelengths. Utilizing XML, a single request for increased bandwidth can be given to all the network elements without requiring provisioning at each layer for each network element. Further, the present invention provides the capability to add new, emerging networking technologies utilizing the same XML framework. For example, a wireless link or storage-area network could be added to the previous example above and it could request network services utilizing the same XML framework.

Figure 2:
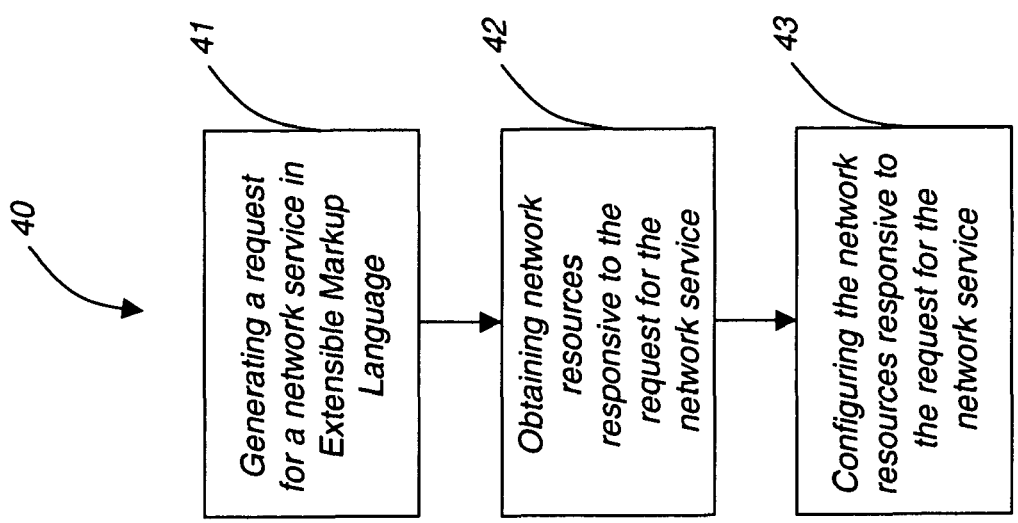
FIG. 2 is a flowchart illustrating an exemplary embodiment of the present invention, utilizing XML to create and control a network route on a telecommunications network.

Referring to FIG. 2, flowchart 40 illustrates an exemplary embodiment of the present invention to set up a network route or the like in a telecommunications network utilizing XML. The telecommunications network can include an optical network (e.g. a DWDM network), a SONET network (e.g. an OC-48, OC-192 network), a data network (e.g. routers, switches), and/or combinations thereof. Particularly, the present invention provides the ability to set up a network route at OSI layers 0 through 3 with XML avoiding the requirement of provisioning different layers separately. A request is generated for a network service in XML (Block 41). The request can be manually configured (e.g. via a user request for a new service) or automatically configured (e.g. via a protection switch responsive to a fault condition). The request can be generated by a network user device or by an internal network element. The network obtains network resources responsive to the request by parsing the XML request and determining from the request those resources that are required at different OSI layers to support the requested service (Block 42). The network responds to the request by configuring network resources at different OSI layers supported by the network in order to provide the requested service (Block 43). For example in an optical network, an XML request to transport information from one network user to another would be supported by a receiving network element by obtaining an available wavelength to support the service and configuring any adaptation needed to carry the network user data transported as part of the service.

Figure 3:
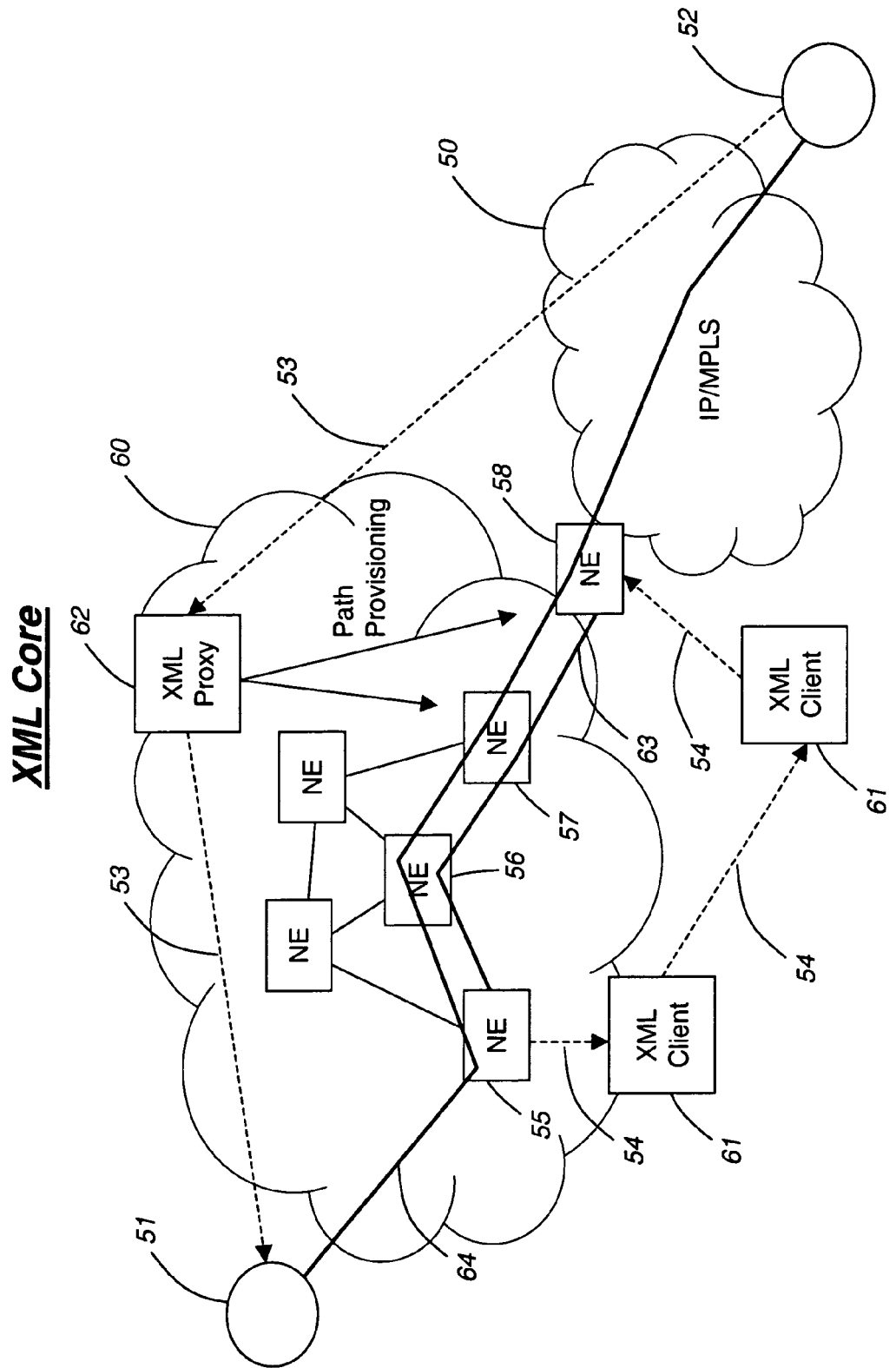
FIG. 3 is a schematic diagram illustrating one exemplary embodiment of the present invention, utilizing XML for network control in a core network including first and second high-bandwidth XML network users connected through an IP/MPLS network and the core network.

Referring to FIG. 3, an exemplary embodiment of the present invention utilizing XML for network control in a core network includes a first and second high-bandwidth network users 51,52 connected through an IP/MPLS network 50 and a core network 60. The network user 52 connects to the IP/MPLS network 50. A network element (NE) 58 operates as a gateway connecting the IP/MPLS network 50 to the core network 60. The IP/MPLS network 50 can include an Ethernet network, such as a gigabit Ethernet network, and it can interconnect to the network element 58 at gigabit Ethernet. The core network 60 includes network elements 55,56,57,58, which can include, for example, SONET multiplexers or data routers.

In the example illustrated in FIG. 3, the network user 52 is operable for sending an XML request 53 to an XML proxy 62, which in turn is sent to the network user 51. The XML request can provide a request for bandwidth on demand, or for a virtual private network service. As illustrated in FIG. 3, the network user 52 requests bandwidth 64 between itself and the network user 51. The XML request message 53 is sent to the XML proxy 62, which in turn provisions the service on the network elements 55,56,57,58 to set up the bandwidth 64 between the network users 51,52. This provides an alternative to a technology-specific network interface to provision bandwidth across OSI layers 0 through 3.

In a second example, illustrated in FIG. 3, a first network element 55 with an associated XML client 61 desires to connect to a second network element 58 in order to support a service between network users 51,52. The XML client 61 sends an XML request message 54 to the XML client 61 associated with network element 58. The XML request message 54 is only sent to the session endpoints at the network elements 55,58. In turn, the core network 60 provisions a service based on the XML request message 54 and bandwidth 63 is provided between the network elements 55,58. For example, this can include provisioning optical bandwidth through a new wavelength, SONET bandwidth by allocating STS-1s, and Ethernet bandwidth. A single XML request message 54 is operable to provision at all of these layers.

Figure 4:
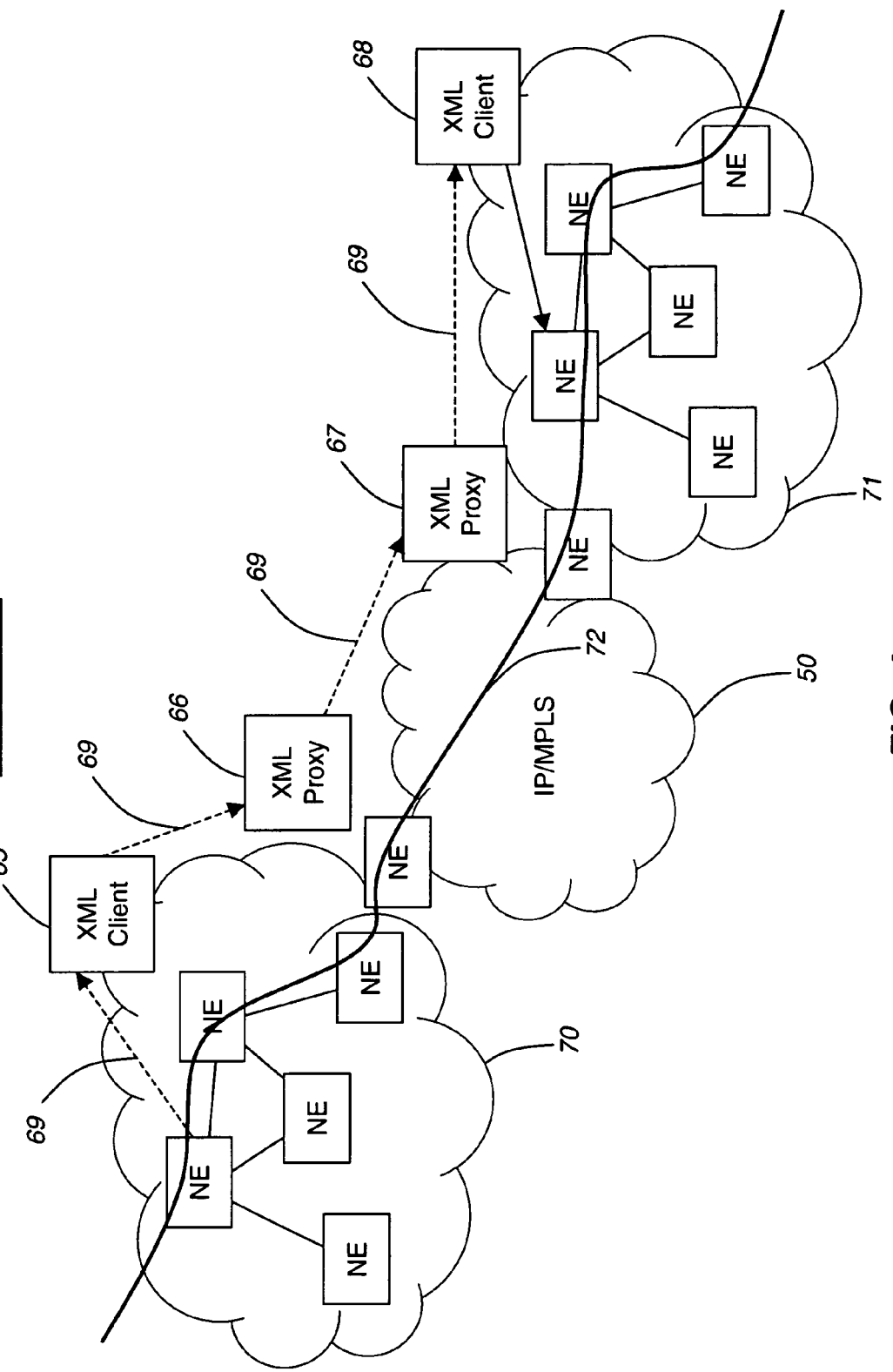
FIG. 4 is a schematic diagram illustrating another exemplary embodiment of the present invention, utilizing XML for network control in a core network including a first core network, an IP/MPLS network, and a second core network, with the first and second core networks connected through the IP/MPLS network.

Referring to FIG. 4, in another exemplary embodiment of the present invention utilizing XML for network control, a core network includes a first core network 70, an IP/MPLS network 50, and a second core network 71, with the first and second networks 70,71 connected through the IP/MPLS network 50. An XML request message 69 is generated by an XML client 65 associated with one of the network elements in the first network 70 requesting a network service involving the transport of network user data through the first and second networks 70,71 and the IP/MPLS network 50. The XML client 65 sends the XML request message 69 to an XML proxy 66, which relays it to another XML proxy 67, which in turn relays it to a second XML client 68. The first XML client 65 provisions a service through the first network 70 and the second XML client 68 provisions a service through the second network 71. Accordingly, bandwidth 72 is provisioned between the networks 70,71 and the IP/MPLS network 50 with a single XML request message 69. Here, XML provides a technology-independent call-control interface, and the XML proxy functions to relay connections across network borders.

Figure 5:
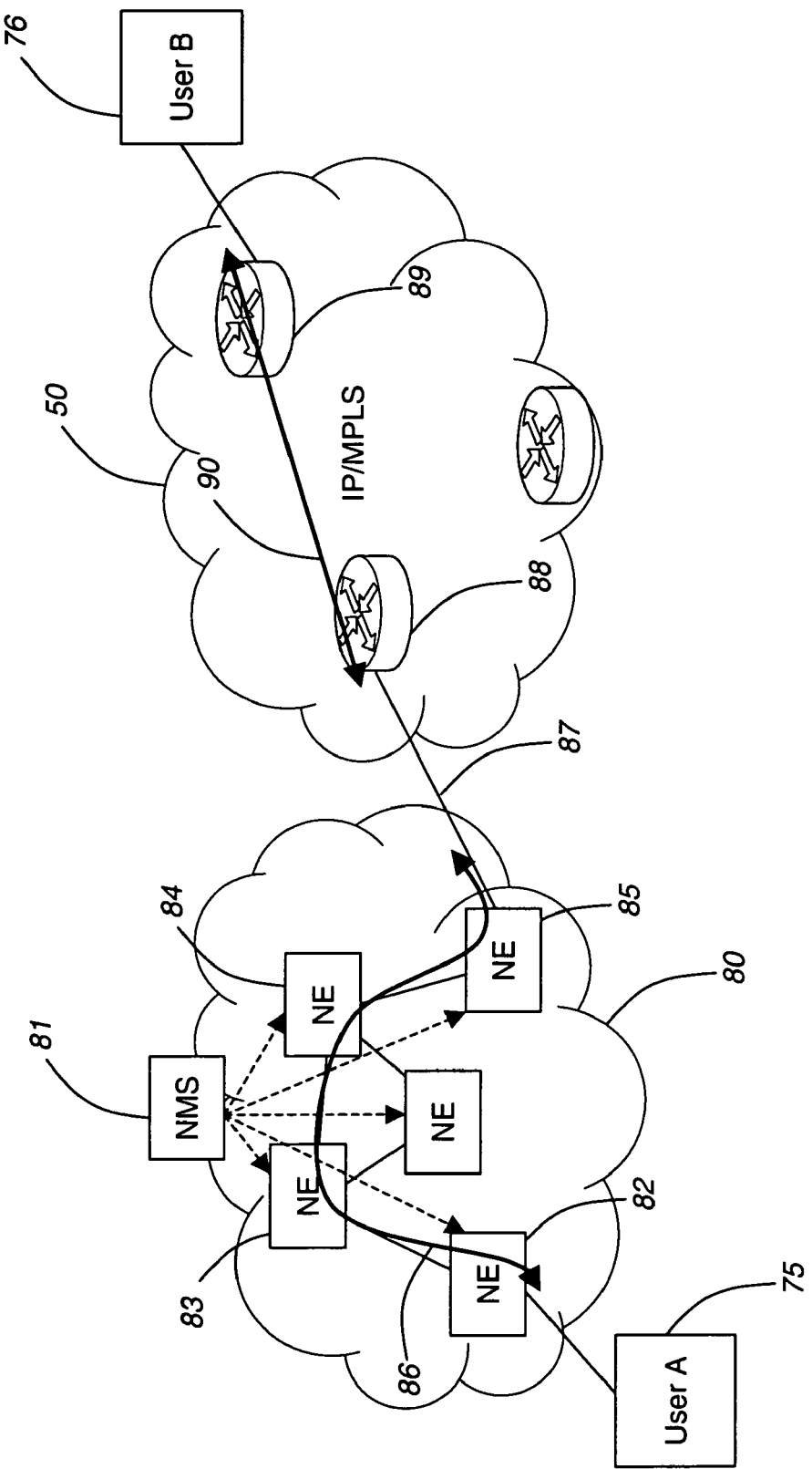
FIG. 5 is a schematic diagram illustrating a further exemplary embodiment of the present invention, utilizing XML for network control via XML interworking with IP/MPLS.
Figure 6:
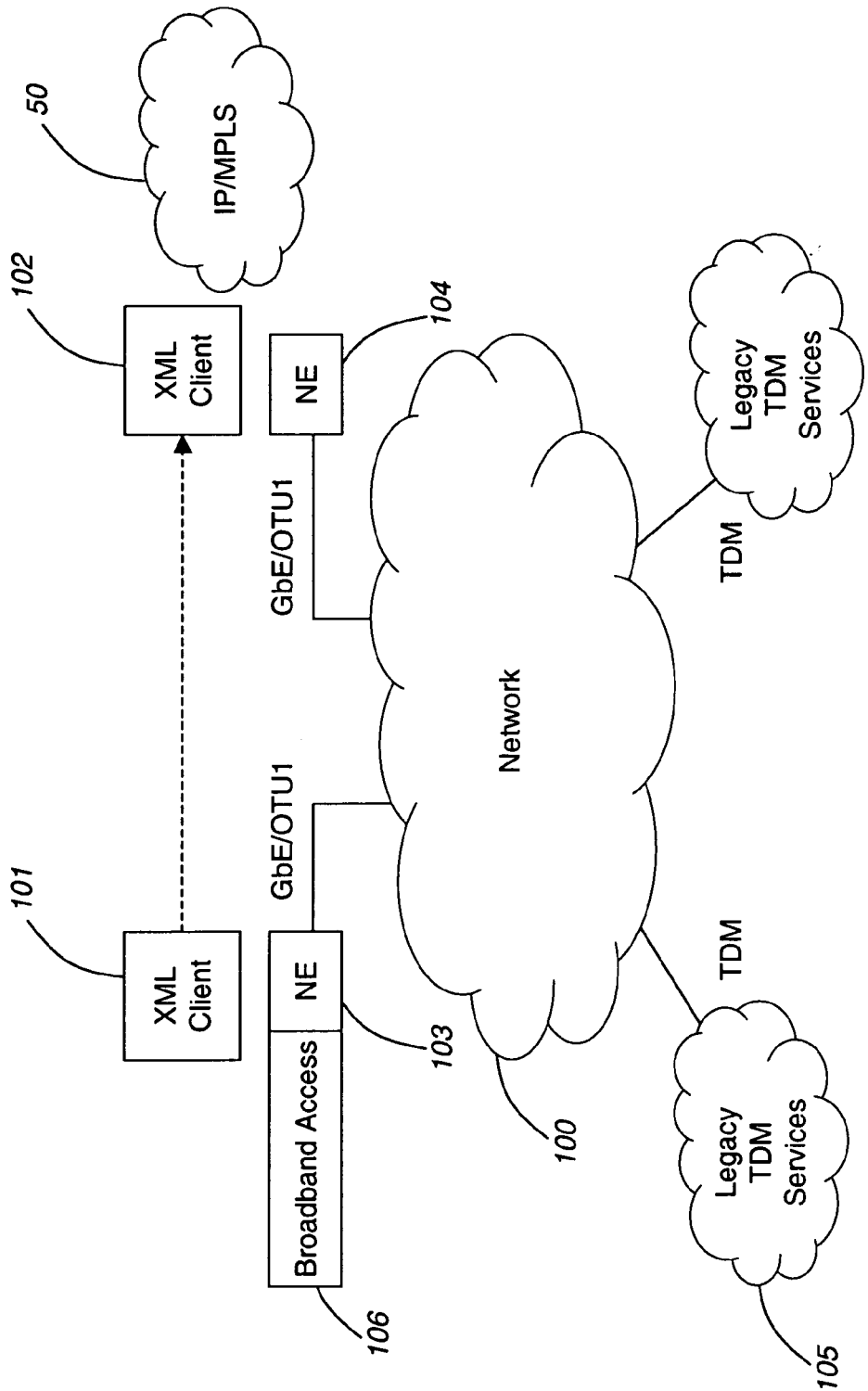
FIG. 6 is a schematic diagram illustrating a still further exemplary embodiment of the present invention, utilizing XML for network control via XML use in an access network.
Figure 7:
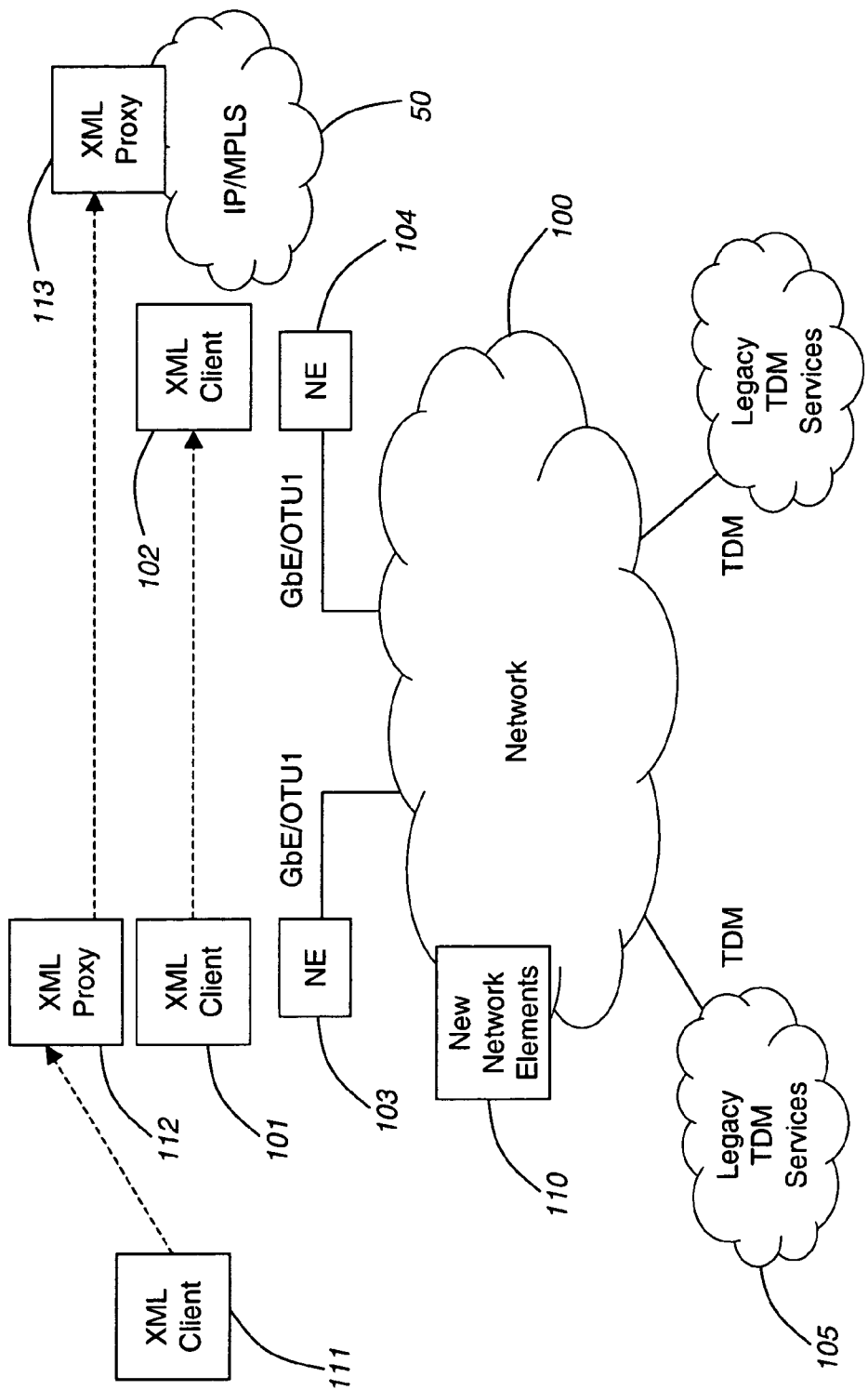
FIG. 7 is a schematic diagram illustrating a still further exemplary embodiment of the present invention, utilizing XML for network control via XML use in an access network.

Referring to FIG. 5, an exemplary embodiment of the present invention utilizing XML for network control, illustrating XML interworking with IP/MPLS, includes a network 80, an IP/MPLS network 50, a network user A 75, and a network user B 76 connected to both the network 80 and the IP/MPLS network 50. The network 80 includes several network elements 82,83,84,85, which can include SONET multiplexers or data routers. In the example of FIG. 7, a first network element 82 is configured with an Ethernet port operable to connect to network user A 75 and this port can be configured through a NMS 81 for a service 86 through the network 80 through the network elements 82,83,84,85. Further, the port connected to network user A 75 can be configured utilizing XML. The port connected to network user A 75 is operable to connect to the IP/MPLS network 50 through a connection 87 from another network element 85.

In a first example, network 80 connects to the IP/MPLS network 50 with an Ethernet connection 87 which can include a 10BaseT, 100BaseT, or gigabit Ethernet port, optionally with a virtual local area network (VLAN). This example is likely when the network 80 is connected to a carrier's existing IP/MPLS network 50. The service 86 is created across the network 80 to the egress network element 85. With regards to the IP/MPLS network 50, core routers 88,89 at each end on the IP/MPLS network 50 are manually provisioned with a label and port/VLAN. These core routers 88,89 are given each other's IP address and LDP or RSVP is used to create an LSP. Once provisioned, traffic will flow from network user A 75 to network user B 76. Here, XML is used between the network elements 82,83,84,85 of network 80 as a call-level signaling indicating the Ethernet service characteristics through the network 80. Optionally, XML can be used on the IP/MPLS network 50 and the routers 88,89.

In a second example, network 80 connects directly to the IP/MPLS network 50 with a connection 87 supporting PWE3 encapsulation. Here, the connection 87 between the network 80 and the IP/MPLS network 50 can include a network element interfacing directly to the router 87. Here, the XML hand-off at the connection 87 allows auto-provisioning of the Ethernet service across both the network 80 and the IP/MPLS network 50. The XML request is free from network specifics. In this case, an IP/MPLS network cannot carry native format of the data, for example it is TDM, so the data is carried across a TDM network as TDM, or across an IP/MPLS network using PWE3 for that section. XML is the request and the network figures out how to provide the necessary resources to carry the data.

Referring to FIG. 8, an exemplary embodiment of the present invention utilizing XML for network control, illustrating XML in an access network, includes a network 100 of the same family of network elements connected together and connected to legacy TDM services 105 in an access network, and to broadband access 106 devices connected to a network element 103. The network 100 additionally includes XML clients 101,102 to provide a technology-independent call or session control function. XML specifies the session characteristics to be supported by the transport connection through the network 100. The XML clients 101,102 are connected to each other through the IP/MPLS network 50 and are configured to accept and relay XML messages. For example, the XML client 101 can send an XML request message to XML client 102 requesting bandwidth between the broadband access device 106 and the IP/MPLS network 50. This message is received by the network 100, which provisions bandwidth services on the network elements 103,104 and provisions a service through the network 100 between the first network element 103 and the second network element 104.

Referring to FIG. 9, another exemplary embodiment of the present invention utilizing XML for network control, illustrating XML in an access network, includes a network 100 of the same family of network elements connected together and connected to legacy TDM services 105 in an access network, connected to new network elements 110, and to broadband access network elements 103,104. Here, XML clients 101, 102 operate as depicted in FIG. 8 to specify the session characteristics to be supported by the transport connection through the network 100. Additionally, FIG. 9 illustrates two XML proxies 112,113 connected to a XML client 111 and the IP/MPLS network 50, respectively. The XML proxy 112 terminates the XML client 111 and provides traditional SIP functions, such as call routing, call forwarding, and other call features. The XML clients 101,102,111 connected to the XML proxies 112,113 are operable to provision bandwidth as needed in the network 100. Further, new network elements 110 are capable of being added to the network and interworking with the XML clients 101,102,111 for control and operation.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A network method utilizing Extensible Markup Language (XML) to establish a network service between network elements in a network, the network method comprising:
    generating a request at a network element for a network service in Extensible Markup Language (XML), wherein the network element comprises an Extensible Markup Language (XML) Client/Proxy entity, wherein the request is one of manually and automatically configured, and wherein the request is directed to another network element;

obtaining network resources responsive to the request, wherein the network resources comprise network parameters required to obtain and provision the network service, and wherein the request controls the network resources across multiple Open Systems Interconnection (OSI) layers comprising any of layer 0, 1, 2, or 3; and configuring the network resources responsive to the request;

wherein the network elements comprise optical network elements, and wherein a network route comprises wavelengths between first and second optical network elements in the network; and wherein the network parameters comprise one or more of available wavelengths, available bandwidth, available regeneration points, available circuits, intermediate network elements, and combinations thereof.

2. The network method of claim 1, wherein the network comprises a plurality of network elements operable to receive Extensible Markup Language (XML) requests.

3. The network method of claim 1, wherein the network comprises one of a telecommunications network, a cable network, an enterprise network, a wireless network, and a combination thereof.

4. The network method of claim 1, wherein the request for a network service in Extensible Markup Language (XML) is carried in Session Initiation Protocol (SIP) or the request for a network service in Extensible Markup Language (XML) carries Session Initiation Protocol (SIP) information.

5. A network utilizing Extensible Markup Language (XML) to establish network services between network elements in the network, the network comprising:

a plurality of network elements operable to receive Extensible Markup Language (XML) requests, wherein each of the plurality of network elements comprises an Extensible Markup Language (XML) Client/Proxy entity; and an Extensible Markup Language (XML) server connected to one or more of the plurality of network elements;

wherein the Extensible Markup Language (XML) requests comprise requests for network resources to establish a network service between two network elements;

wherein the Extensible Markup Language (XML) requests control the network resources across multiple Open Systems Interconnection (OSI) layers comprising any of layer 0, 1, 2, or 3;

wherein the network is operable to configure network resources responsive to the Extensible Markup Language (XML) requests;

wherein the plurality of network elements comprise optical network elements, and wherein a network route comprises wavelengths between first and second optical network elements in the network; and wherein the network resources comprise one or more of available wavelengths, available bandwidth, available regeneration points, available circuits, intermediate network elements, and combinations thereof.

6. The network of claim 5, wherein the network comprises an optical dense wavelength division multiplexed network.

7. The network of claim 5, wherein the network comprises one or more of a telecommunications network, a cable network, an enterprise network, a wireless network, and a combination thereof.

8. The network of claim 5, wherein the Extensible Markup Language (XML) requests are carried in Session Initiation Protocol (SIP) or the request for a network service in Extensible Markup Language (XML) carries Session Initiation Protocol (SIP) information.

9. A network utilizing Extensible Markup Language (XML) to control network resources, the network comprising:

an Extensible Markup Language (XML) application; and one or more nodes, wherein the one or more nodes each comprise an Extensible Markup Language (XML) Client/Proxy entity, and wherein the one or more nodes are connected to an application;

wherein the application is operable to generate network requests for network resources in Extensible Markup Language (XML);

wherein the network requests control the network resources across multiple Open Systems Interconnection (OSI) layers comprising any of layer 0, 1, 2, or 3;

wherein the network is operable to control network resources responsive to the network requests;

wherein the nodes comprise optical network nodes, and wherein a network route comprises wavelengths between first and second optical network nodes in the network; and wherein the network resources comprise one or more of available wavelengths, available bandwidth, available regeneration points, available circuits, intermediate network elements, and combinations thereof.

10. The network of claim 9, wherein the application resides on a database.

11. The network of claim 10, wherein the network request is for bandwidth on the network.

12. The network of claim 10, wherein the network request is directed to the one or more nodes connected to the application.

13. The network of claim 10, wherein the network request comprises a plurality of parameters, wherein the plurality of parameters comprise multiple Open Systems Interconnection layer parameters operable to control network resources.

14. The network of claim 10, wherein the network comprises one or more of a telecommunications network, a cable network, an enterprise network, a wireless network, and a combination thereof.

15. The network of claim 10, wherein the network requests are carried in Session Initiation Protocol (SIP) or the request for a network service in Extensible Markup Language (XML) carries Session Initiation Protocol (SIP) information.

16. The network method of claim 1, wherein the request controls the network resources across multiple Open Systems Interconnection (OSI) layers comprising any of layer 0, 1, 2, or 3 without requiring provisioning at each of the multiple OSI layers.

17. The network method of claim 1, wherein the request comprises a request for optical bandwidth, the obtaining network resources responsive to the request comprises obtaining an available wavelength to support the optical bandwidth, and the configuring the network resources responsive to the request comprises configuring any adaptation needed to carry the optical bandwidth over the available wavelength.

18. The network method of claim 1, wherein the request comprises a request for a new wavelength, SONET bandwidth, Ethernet bandwidth, and combinations thereof;

wherein the obtaining network resources responsive to the request comprises obtaining an available wavelength, obtaining SONET bandwidth by allocating STS-1s, obtaining Ethernet bandwidth, and combinations thereof; and wherein the configuring the network resources responsive to the request comprises configuring any adaptation needed for the available wavelength, configuring the STS-1 s, configuring the Ethernet bandwidth, and combinations thereof.

19. The network method of claim 18, wherein the request is utilized instead of a technology-specific network interface for the new wavelength, the SONET bandwidth, and the Ethernet bandwidth.

20. An Open Systems Interconnection (OSI) layer 0, 1, and 2 network utilizing Extensible Markup Language (XML) to establish network services between network elements in the network, the network comprising:

a plurality of network elements operating at OSI layers 0, 1, and 2, the plurality of network elements are operable to receive Extensible Markup Language (XML) requests, wherein each of the plurality of network elements comprises an Extensible Markup Language (XML) Client/Proxy entity; and an Extensible Markup Language (XML) server connected to one or more of the plurality of network elements;

wherein the Extensible Markup Language (XML) requests comprise requests for network resources at any of OSI layers 0, 1, and 2 to establish a network service between two network elements;

wherein the Extensible Markup Language (XML) requests control the network resources across multiple Open Systems Interconnection (OSI) layers comprising any of layer 0, 1, or 2 without requiring provisioning at each of the multiple OSI layers;

wherein the network is operable to configure network resources responsive to the Extensible Markup Language (XML) requests;

wherein the plurality of network elements comprise optical network elements, and wherein a network route comprises wavelengths between first and second optical network elements in the network; and wherein the network resources comprise one or more of available wavelengths, available bandwidth, available regeneration points, available circuits, intermediate network elements, and combinations thereof.

* * * * *